(12) United States Patent
Tobinai et al.

(10) Patent No.: US 6,349,925 B1
(45) Date of Patent: Feb. 26, 2002

(54) CARBURETOR FOR TWO-STROKE ENGINE

(75) Inventors: Teruhiko Tobinai; Shin-Ichi Ohgane, both of Miyagi (JP)

(73) Assignee: Walbro Japan, Inc., Tokyo (JP)

( * ) Notice: Subject to any disclaimer, the term of this patent is extended or adjusted under 35 U.S.C. 154(b) by 0 days.

(21) Appl. No.: 09/493,363

(22) Filed: Jan. 28, 2000

(30) Foreign Application Priority Data

Feb. 1, 1999 (JP) ............................................. 11-024203

(51) Int. Cl.7 ................................................. F02M 7/26
(52) U.S. Cl. .......................... 261/23.3; 261/46; 261/47; 261/DIG. 1
(58) Field of Search .......................... 261/23.3, 46, 47, 261/23.2, DIG. 1

(56) References Cited

U.S. PATENT DOCUMENTS

| | | | |
|---|---|---|---|
| 2,325,010 A | * 7/1943 | McCurdy | 261/47 X |
| 3,174,469 A | 3/1965 | Rappolt | 261/47 |
| 3,439,658 A | * 4/1969 | Simonet | 261/23.3 X |
| 4,060,062 A | * 11/1977 | Tsutsui et al. | 261/23.3 |
| 4,073,278 A | * 2/1978 | Glenn | 261/47 X |
| 4,094,931 A | * 6/1978 | Karino | 261/23.3 |
| 4,182,295 A | 1/1980 | Zeller et al. | 123/119 EC |
| 4,200,083 A | 4/1980 | Ishida | 261/47 X |
| 4,256,063 A | 3/1981 | Sumiyoshi et al. | 261/23.3 |
| 4,294,205 A | 10/1981 | Iiyama et al. | 261/23.3 |
| 4,333,429 A | * 6/1982 | Iiyama et al. | 261/23.3 X |
| 4,796,579 A | 1/1989 | Wolfe et al. | 123/336 |
| 5,036,816 A | 8/1991 | Mann | 123/361 |
| 5,200,118 A | 4/1993 | Hermle | 261/64.6 |
| 6,000,683 A | 12/1999 | Van Allen | 261/52 |

FOREIGN PATENT DOCUMENTS

| | | |
|---|---|---|
| DE | 342274 | 10/1921 |
| DE | 432953 | 8/1926 |
| DE | 2204192 | 8/1973 |
| DE | 2909637 | 10/1979 |
| DE | 3722424 | 1/1988 |
| EP | 0651142 | 5/1995 |
| JP | 57183520 | 11/1982 |
| JP | 09268918 | 10/1997 |
| WO | 9817902 | 4/1998 |

* cited by examiner

Primary Examiner—Richard L. Chiesa
(74) Attorney, Agent, or Firm—Reising, Ethington, Barnes, Kisselle, Learman & McCulloch, P.C.

(57) ABSTRACT

A carburetor for a two stroke engine with an air passage and a separate fuel and air mixing passage in a carburetor body and the passages having an air valve and a throttle valve, respectively. A coupling connects a valve shaft of the air valve with a valve shaft of the throttle valve and has an area wherein the valves are rotatable relative to each other corresponding to a difference between an opening and closing angle of the air valve and an opening and closing angle of the throttle valve. Preferably, when the throttle valve is in an idle position, the air valve is closed and the throttle valve can be opened through at least some angle from its idle position before the air valve is moved from its closed position. Also, the air valve is preferably fully opened when the throttle valve is moved to its fully or wide open position. Thus, at idle operation of the engine, the air valve is closed to prevent a scavenging air supply from being provided to the engine to avoid an overly lean fuel and air mixture in the engine. When the engine is moved sufficiently off idle, the air valve is opened to supply the scavenging air supply to the engine which facilitates removal of exhaust gases and reduces the escape of a fresh fuel and air mixture through the engine exhaust ports.

13 Claims, 2 Drawing Sheets

CARBURETOR FOR TWO-STROKE ENGINE

REFERENCE TO RELATED APPLICATION

Applicant claims the priority of Japanese patent application, Ser. No. 11-024203, filed Feb. 1, 1999.

1. Field of the Invention

This invention relates to a carburetor for a two stroke engine and more particularly to a carburetor which provides a scavenging air supply independently of a fuel and air mixture.

2. Background of the Invention

In a conventional rotary valve type carburetor, a fuel and air mixture is delivered to the engine through a single bore or mixing passage having a throttle valve. At least in part to reduce engine hydrocarbon emissions, it has been proposed to provide a scavenging air supply to the engine through a second bore in the carburetor. However, at least at engine idle operation, the scavenging air supply is undesirable as it provides too much air to the engine causing an undesirably lean fuel and air mixture in the engine and poor engine performance, stability and acceleration. Further, using a flat circular flap or butterfly type air valve to control air flow through the second bore does not provide a sufficient seal of the second bore even when the valve is in its fully closed position such that some air still flows through the closed valve. Still further, a carburetor of a type wherein the air valve is connected to the throttle valve by means of a lever and a link will be undesirably large in size and expensive to manufacture and assemble.

SUMMARY OF THE INVENTION

For a two stroke engine, a carburetor with an air passage, a separate fuel and air mixing passage and an air valve and a throttle valve connected together by a lost motion coupling. The coupling connects a valve shaft of the air valve with a valve shaft of the throttle valve and has a zone wherein the valves are rotatable relative to each other corresponding to a difference between an opening and closing angle of the air valve and an opening and closing angle of the throttle valve. Preferably, when the throttle valve is in an idle position, the air valve is closed and the throttle valve can be opened through at least some angle from its idle position before the air valve is moved from its closed position. Also, the air valve is preferably fully opened when the throttle valve is moved to its fully or wide open position. Thus, at idle operation of the engine, the air valve is closed to prevent a scavenging air supply from being provided to the engine to avoid an overly lean fuel and air mixture in the engine. When the engine accelerates sufficiently off idle, the air valve is opened to supply the scavenging air supply to the engine which facilitates removal of exhaust gases and reduces the escape of a fresh fuel and air mixture through the engine exhaust ports.

Additionally, according to another object of the invention, a circumferential edge of the air valve is inclined or angled with respect to a generally flat face of the valve in order to increase the effectiveness of a seal created by the engagement between the air valve and carburetor body when the air valve is in its closed position.

Objects, features and advantages of the invention include providing a carburetor which supplies a fuel and air mixture to an engine and selectively provides a scavenging air supply to the engine, terminates the scavenging air supply at low speed and low load engine operation, permits timing of the initial opening of the air valve relative to the throttle valve of the carburetor to be freely set, has an air valve with an improved seal with the carburetor when in its closed position, selectively interconnects a throttle valve and an air valve, permits at least some relative movement between the throttle valve and air valve, does not interconnect the throttle valve and air valve with a lever and link arrangement, avoids providing too much air to the engine, improves engine operation, reduces engine emissions, increases engine fuel efficiency, is of relatively simple design and economical manufacture and assembly, reliable and in service has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
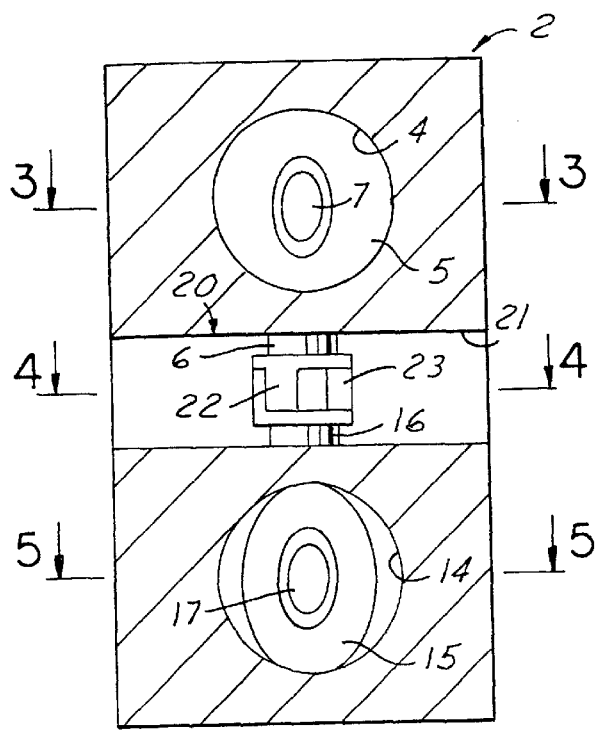
FIG. 1 is a sectional view of a carburetor for a two stroke engine according to the present invention.

As shown in FIG. 1, a carburetor 2 for a two stroke engine has a body 3 with an air passage 4 extending therethrough and having a butterfly type air valve 5 which controls the air flow through the air passage and a separate fuel and air mixing passage 14 also extending through the carburetor body 3 and having a throttle valve 15 to control the flow of air through the mixing passage 14. To interconnect the air valve 5 and throttle valve 15, a lost motion coupling 20 connects a valve shaft 6 supporting the air valve 5 and a valve shaft 16 supporting the throttle valve 15. The coupling 20 is disposed in a channel or slit 21 in an intermediate portion of the body 3.

Desirably, the carburetor 2 is used to supply to an engine both a rich fuel and air mixture through passage 14 and a scavenging air supply through passage 4. The scavenging air supply is fed into a combustion chamber of the engine after combustion to facilitate the removal or exhausting of the combustion gases from the combustion chamber and to provide a buffer between the exhaust gases and the subsequent fresh fuel and air mixture discharged into the combustion chamber to limit the escape from the combustion chamber of the fresh fuel and air mixture through the exhaust ports prior to their closing. The operation of a two stroke engine on which this carburetor 2 is preferably employed is disclosed in Japanese Patent Application No. 8-106187 and known to skilled persons and therefore, a further explanation is omitted.

Figure 2:
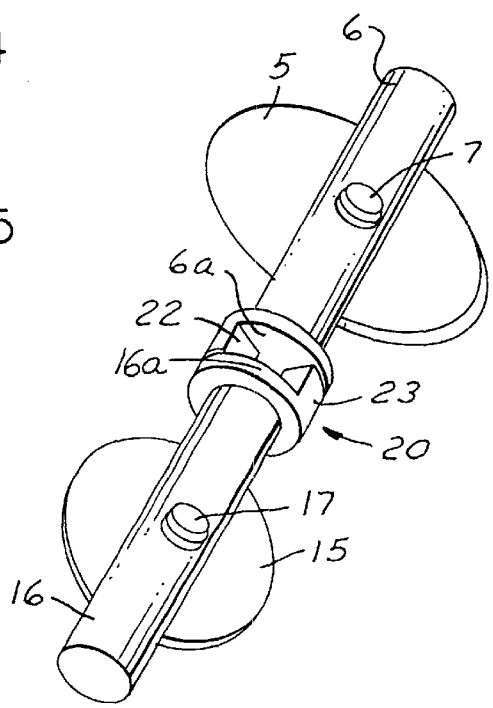
FIG. 2 is a perspective view of an air valve and a throttle valve removed from the carburetor and in assembled relation according to the present invention.
Figure 4:
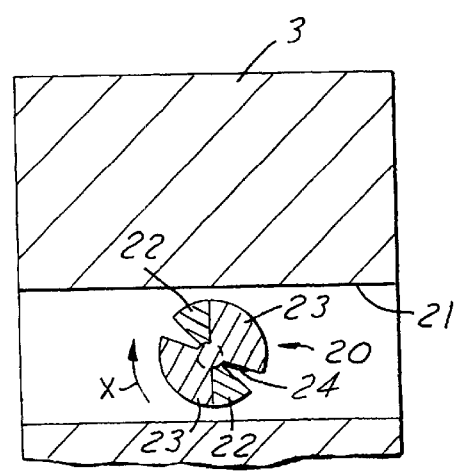
FIG. 4 is a sectional view taken along line 4—4 in FIG. 1.
Figure 6:
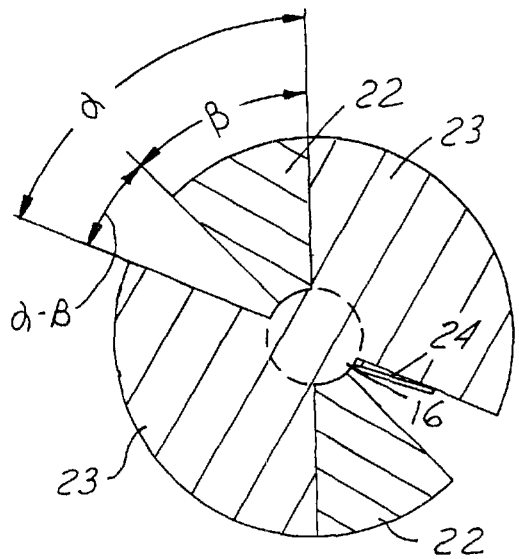
FIG. 6 is an enlarged sectional view of a coupling of the invention.

As best shown in FIG. 2, the air valve shaft 6 and the throttle valve shaft 16 are connected by the coupling 20 and are relatively rotatable in a predetermined range. As shown in FIGS. 4 and 6, a first half 6a of the coupling is carried at one end of the air valve shaft 6 and has a pair of axially extending projections, while a second half 16a of the coupling 20 is carried at a corresponding end of the throttle valve shaft 16 and has a pair of axially extending projections 23. The projections 22 of the first half 6a of the coupling overlap and can abut against the second half 16a of the coupling 20 and the projections 23 of the second half 16a overlap and can abut against the first half 6a of the coupling 20. So connected, the air valve shaft 6 and the throttle valve shaft 16 are adapted to rotate together when the projections 23 abut against the projections 22, and may rotate relative to each other when the projections 22, 23 are not in abutment.

Figure 3:
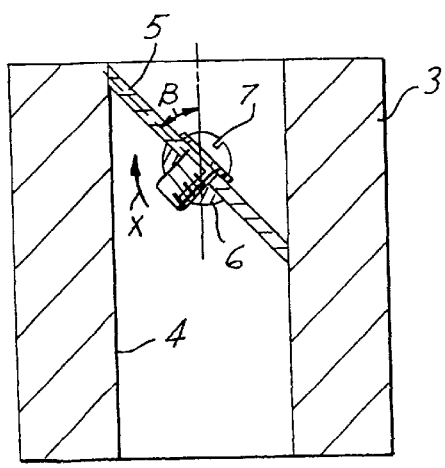
FIG. 3 is a sectional view of the carburetor taken along line 3—3 in FIG. 1.

As shown in FIG. 3, the air valve 5 is connected by a bolt or screw 7 to the air valve shaft 6 which transverses the air passage 4 and is adapted to move to a fully open position when it is rotated in a direction indicated by an arrow X through an angle β from a completely closed position as shown in FIG. 3. The air valve 5 is in a form of a generally elliptical plate so as to close the air passage 4 according to the angle β. Preferably, as shown in FIGS. 2 and 3, the air valve 5 has an angled, inclined or tapered edge adapted to engage and provide a seal with the carburetor body in the air passage 4 when the air valve is closed to at least substantially prevent air flow therethrough.

Figure 5:
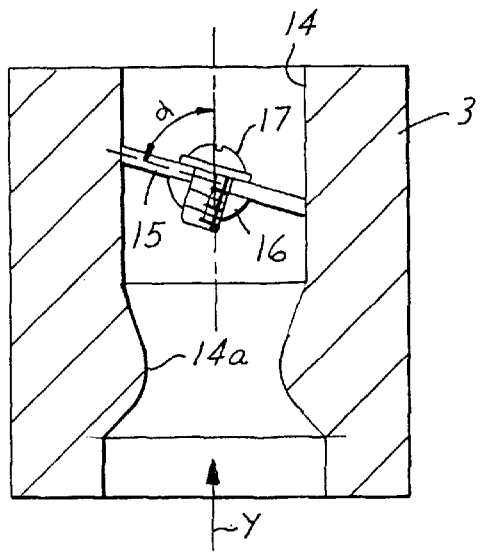
FIG. 5 is a sectional view taken along line 5—5 in FIG. 1.

As shown in FIG. 5, the throttle valve 15 is connected by a bolt or screw 17 to the throttle valve shaft 16 which transverses the mixing passage 14 which has a venturi portion 14a therein. The throttle valve 15 is a generally circular plate and is adapted to be moved to a fully open or wide open throttle position when it is rotated by an angle a such that it is generally parallel to the air flow in the mixing passage 14 (in the direction indicated by the arrow Y). Though not shown in the drawings, the mixing passage 14 is provided with a high speed fuel nozzle at the venturi portion 14a and a low speed fuel injection hole, jet or nozzle near the throttle valve 15 when it is in its closed position. The air flows through the mixing passage 14 in a direction indicated by arrow Y as shown in FIG. 5 and is mixed with the fuel discharged from one or both of the low speed fuel injection hole and the high speed fuel nozzle to provide a rich fuel and air mixture to the engine.

At idle operation of the engine, as shown in FIG. 4, the projections 23 of the second half 16a of the coupling 20 are yeidably biased by a return spring 24 to abut against the projections 22 of the first half 6a of the coupling 20 at their side face opposite to the direction of the arrow X. In this position, the air valve 5 on the air valve shaft 6 closes the air passage 4 as shown in FIG. 3, and the throttle valve 15 is in its idle position substantially closing the mixing passage 14. When the throttle valve shaft 16 is rotated towards its wide open throttle position (i.e. in the direction of the arrow X), until the projections 23 initially engage the other side faces of the adjacent projections 22, the air valve 5 is maintained in its closed position as shown in FIG. 3, as degree to which the throttle valve 15 is opened is increased. Thus, at engine idle operation or relatively low speed, low load operation of the engine, wherein the throttle valve 15 is rotated from the idle position at an angle of α–β or less, the air valve 5 remains closed and the scavenging air will not be supplied to the engine. Therefore, an unstable operation of the engine is avoided by preventing an overly lean fuel and air mixture from being delivered to the engine at idle or low speed, low load engine operating conditions. Desirably, angle α–β is in the range of 3° to 10° and preferably between 5° and 7°.

When the projections 23 of the second half 16a of the coupling 20 engage the projections 22 of the first half 6a and the throttle valve 15 is opened further, the projections 22 are pushed by the projections 23 to rotate the air valve shaft 6 and the throttle valve shaft 16 together in the direction of the arrow X so that the air valve 5 and throttle valve 15 rotate together. Preferably, at the fully opened or wide open throttle position of the throttle valve 15, the air valve 5 is also fully opened.

At high speed and/or high load operation of the engine when the thottle valve 15 is in its wide open position, the air valve 5 is fully opened and a supply of scavenging air flows through the air passage to the engine. At the end of a combustion stroke of the engine, the scavenging air supplied to the engine will be supplied to the combustion chamber to facilitate discharge of the combustion exhaust gas through an exhaust port. In the following air suction-compression stroke, a fresh scavenging air supply will be provided through the air passage 4 to the engine to be stored therein until after the next combustion event of the engine. When the throttle valve 15 is returned from its fully or wide open position to its idle position, the air valve 5 is also returned to its closed position by means of the return spring in association with the throttle valve 15.

Figure 7:
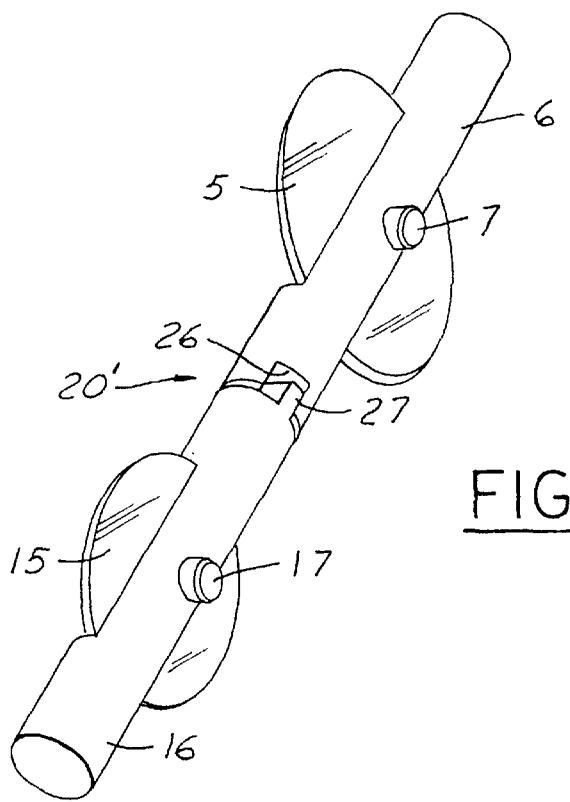
FIG. 7 is a perspective view of an air valve and a throttle valve of the carburetor for the two stroke engine according to a second embodiment of the invention showing the coupling of the air valve shaft and throttle valve shaft.

A second embodiment valve assembly is shown in FIG. 7, to achieve similar control of the air valve 5 and throttle valve 15 with a coupling 20'. In this embodiment, the coupling 20' comprises a groove 26 formed in a radial or dimaetrical direction in the air valve shaft 6 at its lower end face, and a projection 27 in a radial or diametrical direction on the throttle valve shaft 16 at its upper end face for engagement with the groove 26 in such a way that the projection 27 can relatively rotate inside the groove 26 in a range of the rotation angle α–β. A similar effect can be obtained by reversing the projection and groove and providing a diametrical projection at the lower end face of the valve shaft 6 and a diametrical groove at the upper end face of the valve shaft 16. In either form a lost motion coupling 20' is provided which functions in the same Is general manner as the lost motion coupling 20 to achieve the same advantages.

As described above, the carburetor 2 for the two stroke engine according to the invention comprises the air passage 4 and the fuel and air mixing passage 14 arranged in parallel in the carburetor body 3 and having the air valve 5 and the throttle valve 15 respectively, and a coupling 20, 20' which connects the air valve shaft 6 and the throttle valve shaft 16. The coupling 20, 20' permits limited relative rotation of the shafts 6, 16 when the throttle valve 15 is initially moved from its closed or idle position towards its wide open throttle position. This permits the air valve 5 to stay closed at idle and low speed, low load engine operating conditions to prevent scavenging air from being supplied through the air passage to the engine to avoid an overly lean fuel and air mixture in the engine. Additionally, the carburetor can be freely designed with respect to the degree of throttle valve opening at which the air valve 5 begins to open, as needed in different applications and designs. Further, the air valve 5 is designed to provide excellent sealing of the air passage 4 when it is in its closed position. Desirably, the carburetor 2 can be compactly and economically manufactured.

What is claimed is:

1. A carburetor comprising:
   a body;
   an air passage in the body;
   an air valve in the air passage, carried by an air valve shaft and movable between closed and fully open positions;
   a mixing passage in the body;
   a throttle valve in the mixing passage, carried by a throttle valve shaft and movable between an idle position and a wide open position;

a coupling operably connecting the throttle valve shaft and the air valve shaft and having an area wherein the air valve shaft and throttle shaft can rotate relative to each other through an angle which corresponds to a difference between the angle between the closed and fully open positions of the air valve and the angle between the idle and wide open positions of the throttle valve;

the coupling has a first half carried by the air valve shaft with two axially extending projections and a second half carried by the throttle valve shaft with two axially extending projections selectively engageable with the projections of the first half; and a biasing member carried by the coupling and yieldably biasing the air valve to its closed position when the throttle valve is in its idle position or within the area wherein the throttle valve shaft and air valve shaft are relatively rotatable.

2. The carburetor of claim 1 wherein the area corresponds to an angle between 3° and 10°.

3. The carburetor of claim 1 wherein the coupling has a recess carried by one of the throttle valve shaft and air valve shaft and a projection received in the recess and carried by the other of the air valve shaft and throttle valve shaft.

4. The carburetor of claim 1 wherein the coupling is constructed such that when the throttle valve is in its idle position permitting an idle air flow through the mixing passage the air valve is in its closed position at least substantially preventing air flow through the air passage.

5. The carburetor of claim 1 wherein both the air valve and throttle valve are butterfly valves.

6. The carburetor of claim 5 wherein the air valve is generally elliptical.

7. The carburetor of claim 5 wherein the air valve has an inclined edge adapted to engage the body when the air valve is in its closed position to substantially prevent air flow through the air passage.

8. The carburetor of claim 4 wherein the throttle valve is moved from its idle position towards its wide open position by between 5° and 7° before the air valve is moved from its closed position.

9. The carburetor of claim 1 wherein the biasing member is a spring.

10. A carburetor comprising:

a body having a scavenging air passage and a separate fuel and air mixing passage;

an air valve carried by the body in the air passage and rotatable on an axis generally transverse to the air passage between closed and fully open positions;

a throttle valve carried by the body in the mixing passage and rotatable on an axis generally transverse to the mixing passage between idle and wide open positions, the air valve shaft being coaxially aligned with the throttle valve shaft; and a coupling disposed between the air passage and the mixing passage and having an axially extending projection carried by the air valve shaft selectively engageable with an axially extending projection carried by the throttle valve shaft and the projections being configured so that the air valve is closed when the throttle valve is in its idle position, the throttle valve can be opened from its idle position to at least some angle before the air valve is moved from its closed position and thereafter further opening of the throttle valve toward its wide open position simultaneously moves the air valve toward its fully open position.

11. The carburetor of claim 10 wherein the coupling is configured so that the throttle valve is movable from its idle position toward its wide open position through an angle of 3° to 10° before the air valve is moved from its closed position toward its fully open position.

12. The carburetor of claim 10 wherein the air valve has an inclined edge configured to engage the body when the air valve is in its closed position to substantially prevent air flow through the air passage.

13. The carburetor of claim 10 which also comprises a spring carried by the coupling and yieldably biasing the air valve to its closed position when the throttle valve is in its idle position.

* * * * *